Sept. 4, 1923.
B. E. FRERE
PORTABLE SAW
Filed Dec. 12, 1921
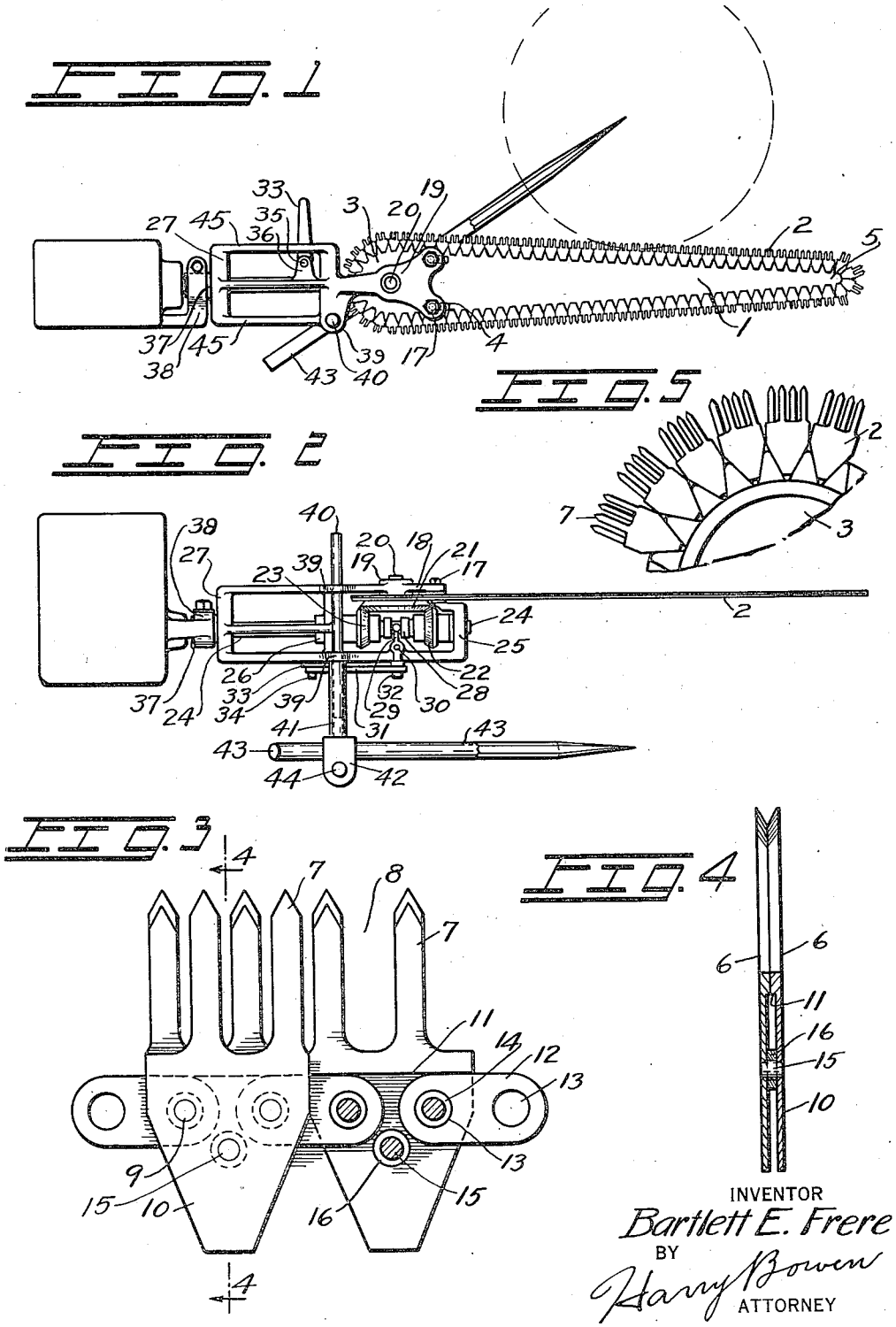
INVENTOR
Bartlett E. Frere
BY
Harry Bowen
ATTORNEY Patented Sept. 4, 1923.

1,467,150

UNITED STATES PATENT OFFICE.

BARTLETT E. FRERE, OF SEATTLE, WASHINGTON, ASSIGNOR OF FORTY-NINE PER CENT TO JAMES W. GAVER, OF EVERETT, WASHINGTON.

PORTABLE SAW.

Application filed December 12, 1921. Serial No. 521,675.

*To all whom it may concern:*

Be it known that I, BARTLETT E. FRERE, a citizen of the United States, residing at Seattle, county of King, and State of Washington, have invented new and useful Improvements in Portable Saws; and I do hereby declare that the following is a full, clear, and exact specification, such as will enable others skilled in the art to which they appertain to make and use the same.

The invention is an attachment consisting of a single blade with a continuous change of teeth running around it and over a driving sprocket at one end which may be attached to any desirable engine or motor for driving it.

The object of the invention is to construct a continuous chain of saw teeth which will run around the edge of a blade made of a single piece of plate and at the same time will be flexible enough to pass around a very small arc so that the end of the blade may be narrowed down to a very small radius and which will at the same time fit over a sprocket at the larger end of the blade for driving the chain.

Another object of the invention is to construct a portable saw with the teeth on a continuous chain running around the edge of a single plate and driven by a sprocket which may be run in either direction.

And still another object of the invention is to construct a continuous chain for a portable saw which will slide around the edge of a single plate the sections of which are linked together with individual links each having case-hardened bushings around the pins in their ends and each section having small rollers pivoted in their centers which bear against the edge of the plate.

With these ends in view, the invention embodies a plate with a sprocket at its end mounted in a suitable frame in which are also suitable gears for driving it and for reversing the direction of travel which are connected to an engine; and a continuous chain around the sprocket and the edges of the plate. The chain is made of individual sections with the lower portions slotted so that they will fit over the edge of a plate and in these slots are suitable rollers for rolling against the edge of the plate and also links for connecting the individual sections together.

Other features and advantages of the invention will appear from the following description taken in connection with the drawings, wherein—

Figure 1 is a plan view.

Figure 2 is a side elevation.

Figure 3 is a detail of the teeth and chain.

Figure 4 is a cross section on line 4—4 of Figure 3.

Figure 5 is a detail showing the chain on a section of the sprocket.

In the drawings I have shown my saw in the position of felling a tree in Figure 1 wherein numeral 1 indicates the blade around which is the chain 2 and in the end of which is the sprocket 3. The blade 1 is constructed of a single piece of plate with the larger end cut out in the shape of an arc to fit around the sprocket 3 and having slots 4 in it by which it may be bolted to the frame. The outer end 5 of the blade 1 may be tapered down to nearly a point and cut on a semi-circle so that the chain will slide around it.

The chain 2 is constructed of two pieces of plate with projections on their upper sides to conform to the shape of saw teeth as shown in one design in Figure 3 and whose lower sections have their edges beveled off from the pitch line so that they may come together when passing around the sprocket or the end of the blade 1. These pieces of plate, indicated by the numeral 6, may be exactly similar so that they may be stamped from the same die as the projections 7 which form the teeth on one plate will fit in the open spaces 8 between the teeth when they are turned around and riveted together by the rivets 9. The lower portions 10 of the plates are slotted from the shoulders 11 so that when they are riveted together there will be a groove between them and this will fit over the edge of the blade 1. The rivets 9 extend thru the upper portion of these grooves and on them may be placed the links 12 which have holes 13 in each end and in these holes may be placed bushings 14 which also fit over the rivets 9 and are free to rotate around the rivets or in the holes 13. In the center of the plates and passing thru the grooves are also rivets 15 which have shoulders against the plates around which are the rollers 16 which are free to rotate on them and these ride against the edge of the blade 1 to eliminate friction and to prevent wear.

The blade 1 is bolted by the bolts 17 to a frame 18 shaped as shown in Figures 1 and 2 in which is a bearing 19 for holding the shaft 20 on which the sprocket 2 is mounted. On the side of the sprocket 2 a bevel disc 21 is fastened which bears against two smaller bevel discs 22 and 23 and these are mounted upon a shaft 24 which is held in the bearings 25, 26 and 27 of the frame 18. The discs 22 and 23 are freely mounted upon the shaft and between them is a double clutch 28 which is keyed to the shaft and operated by the lever 29. This lever is pivoted on a pin 30 in the frame 18 and its outer end is connected to a lever 31 by the bolt 32 and the opposite end of this lever is connected to another lever 33 by a bolt 34. The lever 33 is then pivoted on a bolt 35 to a lug 36 on the frame 18 as shown in Figure 1 and when in the position shown it will leave the clutch in a neutral position so that the saw will be stationary. When the lever 33 is pushed to the right or left it moves the clutch until it engages either the disc 22 or the disc 23 one of which operates the saw in one direction by engaging one side of the large disc 21 and the other of which operates the saw in the opposite direction as it engages the opposite side of the disc 21.

A hub 37 projects from the end of the frame 18 and into a clamp 38 on the end of the engine housing which permits the saw to be twisted while the engine remains stationary.

On the frame 18 are lugs 39 in which a rod 40 may be placed which projects out on each side of the frame. A rod with a round hole in it 41 may be placed over one end of this rod and the opposite end of the rod 41 which may have a U clamp 42 on it may fit over the end of the spike 43 and be clamped to it by the bolt 44 in order to hold the device to the side of a tree or log into which the spike has been driven.

It will be understood that changes may be made in the construction without departing from the spirit of the invention. One of which changes may be in the use of teeth of a different design than shown or in the omission of some of the teeth. Other changes may be in the omission of the bushings around the rivets or in the use of ball-bearings or roller bearings around the rivets, or in the use of a curved edge instead of the straight beveled edge or the lower portion of the chain sections so that they will fit around the sprocket teeth.

And still other changes may be made in the design of the frame 18 or in the arrangement of the discs and clutches in the frame or in the addition of additional gears to reduce the speed, or in the use of bevel gears instead of the discs shown.

The construction will be readily understood from the foregoing description. To use the device it is assembled as shown in Figures 1 and 2 and carried by the bars 45 on the frame between the saw and the engine to a tree or log and the spike 43 driven into the log in such a position that when the rod 40 is placed into the hole in the rod 41 the saw may be brought up against the side of the log and operated by shifting the lever 33 as hereinbefore described. It will be seen that a chain constructed in this manner will travel at a very high speed around a very small radius and it will therefore not be necessary to have a sprocket at the outer end of the blade.

Having thus fully described the invention what I claim is new and desire to secure by Letters Patent is:—

1. A device of the type described comprising a portable saw chain made in short sections, teeth on the outer edge of the sections, a groove thru the center of the sections and in their lower end, links in the grooves for holding the sections together, rivets thru the sections which pass thru the grooves on which the links are pivoted, bushings over the rivets, other rivets also in the sections passing thru the grooves with shoulders on them for holding the sides of the sections apart and rollers freely mounted upon the rivets.

2. A portable saw of the type described embodying a continuous chain constructed in short sections having teeth on the outer edge of the sections, grooves on the inner side of the sections which permit the sections to ride over the edge of a plate, rollers in the grooves which bear against the edge of the plate, and links in the grooves connecting the sections together.

BARTLETT E. FRERE.